(12) United States Patent
van Esbroeck et al.

(10) Patent No.: US 7,744,449 B2
(45) Date of Patent: Jun. 29, 2010

(54) METHOD FOR PROCESSING POULTRY

(75) Inventors: Maurice Eduardus Theodorus van Esbroeck, Bemmel (NL); Adrianus Josephes van den Nieuwelaar, Gemert (NL); Radboud Hubert Gerard Zwanikken, Boxmeer (NL)

(73) Assignee: Stork PMT B.V., Boxmeer (NL)

( * ) Notice: Subject to any disclaimer, the term of this patent is extended or adjusted under 35 U.S.C. 154(b) by 0 days.

(21) Appl. No.: 11/797,174

(22) Filed: May 1, 2007

(65) Prior Publication Data

US 2007/0207716 A1    Sep. 6, 2007

Related U.S. Application Data

(63) Continuation of application No. 10/758,926, filed on Jan. 16, 2004, now Pat. No. 7,249,998, which is a continuation of application No. PCT/NL02/00480, filed on Jul. 17, 2002.

(30) Foreign Application Priority Data

Jul. 17, 2001    (NL)    .................................... 1018566

(51) Int. Cl.
    *A22B 3/06*    (2006.01)
(52) U.S. Cl. ...................................... 452/58
(58) Field of Classification Search ................... 452/52, 452/57, 58, 66, 198
    See application file for complete search history.

(56) References Cited

U.S. PATENT DOCUMENTS

| | | | |
|---|---|---|---|
| 3,702,017 A | 11/1972 | Lewis | |
| 3,729,773 A | 5/1973 | Dillon | |
| 3,828,397 A * | 8/1974 | Harben, Jr. ................... | 452/59 |
| 3,918,123 A | 11/1975 | Harben, Jr. | |
| 4,092,761 A | 6/1978 | McWhirter | |
| 4,196,221 A * | 4/1980 | Dew ........................... | 426/235 |
| 4,675,947 A | 6/1987 | Clatfelter et al. | |
| 4,860,403 A * | 8/1989 | Webb et al. ................... | 452/58 |
| 5,326,308 A | 7/1994 | Norrie et al. | |

(Continued)

FOREIGN PATENT DOCUMENTS

EP    0 032 110 A    7/1981

(Continued)

OTHER PUBLICATIONS

Jones, J.M., "Tenderising By Electrical Stimulation," Poultry International, Mar. 1, 1991, vol. 30, No. 3, pp. 36 and 38.

*Primary Examiner*—Thomas Price
(74) *Attorney, Agent, or Firm*—Birch, Stewart, Kolasch & Birch, LLP

(57) ABSTRACT

A method for processing poultry, includes supplying live poultry, stunning the live poultry in a stunning device, placing the stunned poultry into product carriers advanced along a conveyor, killing the poultry and removing the feathers from the dead poultry in a plucking device. Downstream of the plucking device, the poultry is exposed to an electrical stimulation, an electrical voltage being applied across the carcass of the poultry. A method for controlling process parameters, especially the time and duration of execution of working steps in a process of mechanized working of slaughtered poultry, includes evaluating the tenderness of a specified meat portion prior to a due processing step and, after this evaluation, setting the important process parameters for the particular processing step to an optimal value.

24 Claims, 7 Drawing Sheets

U.S. PATENT DOCUMENTS

| | | | |
|---|---|---|---|
| 5,512,014 A | 4/1996 | Burnett | |
| 5,643,072 A * | 7/1997 | Lankhaar et al. | 452/66 |
| 5,704,830 A | 1/1998 | Van Ochten et al. | |
| 5,888,132 A | 3/1999 | Burnett | |
| 5,899,802 A | 5/1999 | Burnett | |
| 5,954,572 A | 9/1999 | Kettlewell et al. | |
| 5,954,573 A | 9/1999 | Ohgaki et al. | |
| 6,001,655 A | 12/1999 | Spadaro et al. | |
| 6,006,659 A | 12/1999 | Rosenthal | |
| 6,290,592 B1 | 9/2001 | Allen et al. | |
| 6,338,673 B2 | 1/2002 | Berry et al. | |
| 6,783,451 B2 * | 8/2004 | Aandewiel et al. | 452/173 |
| 6,796,892 B2 | 9/2004 | Allen et al. | |
| 6,912,434 B2 * | 6/2005 | van den Nieuwelaar et al. | 700/116 |
| 7,025,669 B2 | 4/2006 | Richards et al. | |

FOREIGN PATENT DOCUMENTS

| | | |
|---|---|---|
| GB | 2 318 719 A | 5/1998 |
| WO | WO-98/19550 | 5/1998 |
| WO | WO-00/40094 | 7/2000 |
| WO | WO-00/165920 A1 | 9/2000 |
| WO | WO-01/37674 A1 | 5/2001 |
| WO | WO-03/007721 A2 | 1/2003 |
| WO | WO-03/007721 A3 | 1/2003 |

* cited by examiner

METHOD FOR PROCESSING POULTRY

CROSS-REFERENCES TO RELATED APPLICATIONS

This application is a continuation application of U.S. application Ser. No. 10/758,926, filed on Jan. 16, 2004, now U.S. Pat. No. 7,249,998 which is a continuation application of PCT/NL02/00480 filed Jul. 17, 2002, which is incorporated herein by reference. Priority is claimed from The Netherlands Patent Application No. 1,018,566 filed Jul. 17, 2001. Each of the above-identified applications is incorporated herein by reference.

FIELD OF THE INVENTION

This invention relates in general to a method for processing poultry, comprising the steps of supplying live poultry, stunning the live poultry in a stunning device, placing the stunned poultry into product carriers advanced along a conveyor, killing the stunned poultry and removing the feathers from the dead poultry in a plucking device.

DISCUSSION OF THE PRIOR ART

In the poultry-processing industry, poultry such as hens, chickens, turkeys and the like is processed in slaughterhouses, inter alia, into products intended for human consumption. Examples of such edible products are, for example, breast fillets, legs, thighs and products comprising edible organs, such as, for example, livers and hearts.

Before the poultry can be processed, it is first stunned and then killed. The stunning of the poultry is effected, for example, by exposing the poultry briefly to an electric voltage or by placing the poultry in a room containing a stun gas. The object of stunning the poultry, either by means of an electric voltage or in some other manner, is to render the poultry semi-conscious, conscious, so that the poultry will not struggle to free itself from the product carriers. Such struggling can result in broken wings and other damage to the poultry, thereby reducing the value of the poultry.

The killing of the poultry is usually effected by cutting the neck, so that the poultry will bleed to death. It is also possible to re-expose the poultry to an electric voltage, whereupon the poultry is electrocuted, however, and therefore killed.

Of great importance to the poultry-processing industry is the supply of products which meet the specific desires of the consumer. In particular, the consumer expects a large measure of quality in the products which he buys. Within the framework of the present application, the term quality is defined and hereinafter used as the degree to which a product at a certain moment satisfies the needs, that is to say the expectations and desires of a specific consumer. One of the quality requirements which poultry meat must satisfy is that it should have a sufficient degree of tenderness. Tenderness is a characteristic of meat which is experienced by the consumer after having prepared the meat in a normal manner.

The degree of tenderness can be measured by conducting so-called sensory measurements using a technical or consumer panel. In this, a group of specially trained persons is served a number of prepared pieces of meat and is asked to pass judgement on a number of characteristics of the meat, including tenderness. Finally, the persons in the panel rate the products on a scale between very tender and very tough. This way of determining tenderness is, however, a subjective method. An objective method for measuring tenderness is the measurement of the so-called "shear force" or shear stress. The shear force can be measured, for example, with a Warner-Bratzler instrument, in which case a scissors-shaped tool can be used to measure the force which is necessary to slice through or cut a piece of meat. These measurements can then be recalibrated using a sensory panel.

In addition to the tenderness, the moisture-binding characteristics of the poultry meat are also assessed by the sensory panel, both before, during and after the cooking thereof. Together with the visual characteristics of the meat (how does it look) and the microbiological quality of the meat, the moisture-binding characteristics of the meat have a bearing upon the final tenderness as experienced by the consumer. A high loss of moisture during cooking (high cooking loss) results in a dry product, which, though the "shear force" value is the same, is experienced by the consumer as less tender.

A product having poor tenderness, poor moisture-binding and/or a product which has suffered a loss of moisture through spontaneous departure from the product (drip loss) or through loss of moisture resulting from the cooking of the product, is experienced by the consumer as a tough and stringy product.

A following quality requirement which the consumer places on the poultry meat which he finally consumes is that the quality should be as constant a variable as possible. That is to say that a consumer will not accept too large a spread in terms of the quality, for example the tenderness, of the product.

From practice, it has already been known for some considerable time that tenderness is a characteristic of meat products which is substantially determined by the time after the death of an animal at which the meat is removed from the bones. This time is referred to, in practice, as the post-mortem deboning time and will hereinafter be used as such.

It is an empirical fact that, where post-mortem deboning times are short, that is to say shortly after the death of a slaughter bird to be processed, the outcome is a tough product. At the same time, it is an empirical fact that, in addition to a tough product, a large variation in tenderness also occurs between different products having the same short post-mortem deboning time.

The culmination in a tough end product, when deboning is carried out too soon after death, finds its origin in the following. As long as a muscle remains connected to the skeleton of the poultry, it is not possible for the muscle to contract unrestricted. A muscle contraction after the death of the slaughtered animal is provoked by the so-called "Rigor Mortis" (RM).

Shortly after the death of an animal, a certain amount of energy is still present (stored) in its muscles. If a muscle is cut away from the skeleton before RM has set in, then the muscle will severely contract under the influence of this residual energy still present in the muscle in question and the muscle will stiffen. The energy supply still present in the muscle is substantially present in the form of glycogen, which, via intermediate products such as glucose, is ultimately converted into lactic acid and hence the pH in the muscles will fall. As a result of this muscle stiffening, a piece of meat, after having been prepared in a normal manner, will have poor tenderness, which is undesirable with a view to preventing unwanted toughness if the slaughtered poultry is left to mature for a lengthy period. Such a maturing time, easily, occupies a period of about 6 to 24 hours, depending on the kind of poultry. During the maturing period, the poultry is stored and the tenderness of the meat will improve if the meat is deboned once the maturing period has ended.

At the same time, less spread will be found in tenderness between the different birds from the same flock. The late deboning of the product has, however, a number of drawbacks. Through postponement of the post-mortem deboning time, together with the tenderness and the spread therein, a number of other quality factors change, such as the colour of the product, the degree of moisture-binding in the product and the texture of the surface of the product, the texture of the product, above all, having possible repercussions for the further processing of the product. Furthermore, as previously stated, when deboning takes place at a late stage after the point of death, the need arises for a maturing period in which the slaughter bird has to be stored for a certain time, so that the muscle tissue will tenderize again under the influence of natural processes. This is disadvantageous, however, since costly storage areas have to be provided and there is the risk of the meat becoming infected whilst the slaughtered birds are stored, the chance of infection increasing with increasing storage length.

A possibility for shortening the maturing period and hence arriving at a shorter post-mortem deboning time and the simultaneous improvement of the spread in quality of the different products is the use of an electrical stimulation or electrostimulation of the slaughtered poultry prior to its deboning.

Electrostimulation is a form of direct stimulation of muscle tissue, in which the muscle tissue is directly stimulated by applying an electric voltage across a slaughtered bird. As a result of this stimulation, the muscles are agitated and incited to perform work. As work is performed by the muscles, the glycolysis process in the muscles of the slaughtered bird is accelerated. The glycogen still present in the muscle is ultimately converted, via intermediate products such as glucose, into lactic acid. The pH in the muscles thereby falls. Through the stimulation of the muscles, the energy supply is therefore more rapidly spent, the stimulated muscle enters sooner into RM and the hanging process will be accelerated. Deboning can thus be carried out sooner after death without consequent lack of tenderness having to be suffered and it is thus possible to debone earlier post-mortem, thereby largely overcoming the abovementioned drawbacks.

The use of electrostimulation for the tenderization of poultry meat is known from the American patent publication U.S. Pat. No. 5,888,132.

U.S. Pat. No. 5,888,132 discloses a device and a method for processing poultry carcasses, especially the electrical stimulation of poultry carcasses, with the object of tenderizing the meat by exhausting the supply of stored biochemical energy present in the muscle tissue and producing an accelerated maturing of the meat. In the known device and method, the poultry is suspended from product carriers, the product carriers being advanced along a conveyor, and the poultry is successively stunned, sprayed with water and killed, after which the poultry is advanced along two electrically conductive rods across which there is an electric voltage differential, so that the poultry is subjected to an electrical stimulation. After the electrical stimulation of the carcasses, these are plucked and subjected to further processing operations, such as deboning and the like.

The electrically conductive rods of the known device are placed in such a way relative to the carcasses that electrical stimulation takes place across the breast portion of the poultry. The carcasses are herein exposed to a constant electrical stimulation with an alternating voltage ranging from 100 to 250 V with a strength of current ranging from 120 to 500 mA for a period of 8 to 13 seconds.

U.S. Pat. No. 5,888,132 further teaches an electrical stimulation of the carcasses by dragging the carcasses through a bath containing a salt solution, an aqueous solution or by dragging the head of a carcass over a charged metallic mesh or grid, the legs being earthed via the product carrier.

The use of electrostimulation to accelerate the maturing process is also known from International Patent Application No. 98/19,550.

International Patent Application No. 98/19,550 describes a method for accelerating the maturing of the carcass of a slaughtered bird, a natural maturing period being avoided. The known method comprises the step of electrically stimulating the slaughtered bird, the slaughtered bird being exposed to a pulsed voltage for a continuous period. International Patent Application No. 98/19,550 further describes the cooling of the slaughtered poultry after its electrical stimulation. The slaughtered poultry is cooled to about 5° C., after which it is then transported to a downstream processing station for the further processing of the poultry.

International Patent Application No. 98/19,550 further teaches that it is desirable to carry out the electrical stimulation of a slaughtered bird as quickly as possible after the point of death, preferably after 90 seconds.

A subsequent use of electrostimulation for accelerating the maturing process is known from U.S. Pat. No. 5,512,014.

U.S. Pat. No. 5,512,014 describes a method and a device for electrically stimulating poultry carcasses with a view to tenderizing the meat and shortening the maturing period during processing of the poultry in a slaughterhouse. In the known method, the poultry is subjected to electrical stimulation some time after the neck has been cut, thereby allowing the poultry to bleed sufficiently dry. The poultry is then stripped of its feathers and conveyed to a further processing line.

In the abovementioned methods, the electrical stimulation takes place as a step in a processing process for slaughtered birds. Practice has shown, however, that the yield from the plucking process (pluckability), in which the slaughtered poultry is stripped of its feathers, is damaged by the preceding electrical stimulation. In practice it has been shown that the stiffening which occurs after electrostimulation in the muscles of slaughtered poultry makes the plucking considerably more difficult as a result of the feathers becoming more firmly entrenched in the skin. Such a reduction in pluckability proves in practice to be a drawback of the known method.

It is further a drawback of the known methods that the supply of stored biochemical energy present in the muscle tissue of the slaughtered poultry is not fully exhausted during the electrostimulation, so that further considerable stiffening of the muscle tissue will occur. The need is still thereby created for a maturing period in which the slaughtered poultry is stored for a certain period to allow the muscle tissue to re-tenderize under the influence of natural processes. This is disadvantageous, however, since costly storage areas have to be provided and there is the risk of the meat becoming infected whilst the slaughtered poultry is stored, the chance of infection increasing with increasing storage length.

SUMMARY OF THE INVENTION

A first object of the present invention is therefore to provide a method for processing slaughtered birds which eliminates the abovementioned drawbacks.

In accordance with a first aspect of the present invention, a method according to the invention comprises the exposure of the poultry, downstream of the plucking device, to an electrical stimulation for at least a first stimulation period.

By arranging the electrical stimulation of the poultry downstream of its plucking, the occurrence of reduced pluckability as a result of the electrical stimulation is first of all prevented. In addition, the tenderizing effect of the plucking can thereby be utilized. For the plucking of poultry, and especially the mechanical plucking of slaughtered poultry, has, just like electrostimulation, a tenderizing effect upon the muscles of the slaughtered poultry. Just as with electrostimulation, the mechanical plucking sets to work the cells in the muscles of the poultry and therefore ensures an acceleration of the maturing process and hence the quicker onset of RM. Investigation has shown that, by carrying out the electrical stimulation of the poultry after its plucking, the energy supply still present in the muscles can be further exhausted. This results in a better, that is to say a more tender, end product. The electrical stimulation of slaughtered poultry additionally has the advantage that, apart from an acceleration of the maturing process, an improvement is additionally attained in the spread relating to the characteristics important to the quality of the meat product, of which tenderness is one of the more important characteristics.

Moreover, an acceleration of the maturing process in the manner according to the invention offers the advantage that deboning can be carried out at an early stage after death (post-mortem), whilst nevertheless maintaining good tenderness of the end product. In addition, less storage capacity is required in comparison with the known methods and the production processes can take place in-line. Furthermore, a one-day gain is obtained in the shelf life of the end product.

In a preferred embodiment of the method according to the invention, an electric voltage is applied across the carcass of the poultry, or at least across a part thereof, electrical contact occurring at the location of the breast of the carcass, so that a good through-flow through the corpse is achieved. In addition, the most meat and the most important portion of meat, which should have the best possible tenderness, is to be found at the location of the breast. In addition, the neck escapes such stimulation, thereby preventing distortion of the neck, which has advantageous consequences for the rest of the process. If, indeed, the neck of the carcass becomes distorted as a result of the electrical stimulation, the head and neck are made considerably more difficult to remove.

In a further preferred embodiment of the method according to the invention, the carcass is led by the breast over at least one electrode connected to a power source, preferably an electrically conductive rail, the legs of the carcass being earthed via the product carrier. It is thereby possible to guarantee a substantially constant supply of energy to breast and legs and a good contact is achieved between the carcass to be stimulated and the electrode.

In a further preferred embodiment of the method according to the invention, a force is applied to the carcass in the direction of the rail as it is led along the rail. In particular, the carcass, at least whilst it is being led along the rail, has an oblique position substantially at right angles to its direction of motion. The effect of these measures is that the carcass, in the second case under the influence of gravity, rests against the rail and remains in sliding contact with the rail as the carcass is led over it. Furthermore, a secure transfer of energy is realized. In a preferred embodiment of the method according to the invention, at least a first, zero-voltage rest period ($t_2$) is provided after the first stimulation period ($t_1$) and a second stimulation period ($t_3$) after the first rest period ($t_2$), during which second stimulation period ($t_3$) the poultry is exposed to an electrical stimulation in which an electric voltage ($V_1$) is applied across the carcass of the poultry, or at least across a part thereof. By carrying out a second electrical stimulation after a first electrical stimulation followed by a zero-voltage period, the (biochemical) energy supply still present in the muscles proved able to be further exhausted. The rigor mortis process which sets in in the muscles of the slaughtered poultry is thereby substantially accelerated and a more tender product is eventually obtained. The period for further maturing of the poultry can therefore be shortened.

In a further preferred embodiment of the method according to the invention, the carcass, during the first stimulation period ($t_1$) and the second stimulation period ($t_3$), is exposed to a pulsating alternating voltage ($V_1$). The administration of a pulsating current proved to be very effective. When a pulsating current is used, the carcasses are exposed to a voltage pulse having an associated pulse time and a following zero-voltage period having an associated relaxation time. Preferably, the pulse time amounts to about 0.5 second and the relaxation time amounts to about 1 second.

Preferably, during the electrical stimulation of the poultry, a thin film of water is applied to the place where the electrical contact takes place, for example the breast of the poultry, and the electrode is also moistened. A very good result is thereby achieved and local (over-)heating of the skin of the poultry and hence possible unwanted discoloration is thereby prevented.

A further important criterion in assessing the quality of the meat of slaughtered animals, especially slaughtered poultry, is the development in tenderness. One aspect of the invention is the insight that the gathering of data relating to the tenderness, especially the development in tenderness, of the meat at various points in the production process offers the possibility of finely adjusting this process on the basis of the data obtained.

In particular, for a further optimization of the processing process, it is important that the various working steps should be carried out at the right moment (time) and, where applicable, for the most suitable duration.

The object of this is once again to produce a product of the highest possible quality, in particular as tender a product as possible, with which a minimum possible spread in quality-determining factors is additionally achieved.

In order to achieve this object, the invention according to a second aspect thereof provides a method for processing poultry which additionally comprises the step of controlling process parameters, especially the time and duration of execution of processing steps in a process of mechanized working of slaughtered animals, especially poultry, consisting in that the tenderness of a specified meat portion is evaluated prior to a due processing step and, after this evaluation, the important process parameters for the particular processing step are set to an optimal value.

If the slaughtered animals are birds, the breast meat is preferably chosen as the meat portion to be evaluated. The evaluation can be carried out prior to the deboning, or prior to the filleting or prior to the cooling or hanging and, if so desired, prior to the electrical stimulation of the slaughtered bird.

In particular, the evaluation is important for the cooling, since, after all, the duration of cooling—which precedes the filleting—has a major influence on the quality (tenderness) of the product finally obtained. Lengthy cooling can improve tenderness but demands a lot of energy and thus adds to the cost price; with the proposal of the invention, an optimal cooling length can be set and corresponding savings can be realized.

Furthermore, the evaluation of tenderness prior to the electrical stimulation is advantageous. As already described above, the electrical stimulation of slaughtered poultry has a positive influence on the tenderness and development in tenderness of the poultry. This influence can be still further enhanced if, prior to the electrical stimulation, the (instantaneous) tenderness of the poultry is known and, on the basis of these data, the electrostimulation process can then be controlled in such a way that an optimal effect can be achieved.

Therefore the combination of measuring the tenderness during the processing process, controlling the various working steps on the basis thereof and, in particular, electrically stimulating the slaughtered birds is an especially suitable way of producing a very tender product over a very short maturing period, a very low spread additionally being obtained in the characteristics important to the quality of the product.

The tenderness can be determined by measuring the respective diffuse reflection coefficients of this specimen for radiation with different specified wavelengths in the visible and near-infrared zone, by comparing the measurement values thus obtained with those obtained from a similar determination carried out on specimens having a known tenderness measure and by deriving therefrom a variable which characterizes the tenderness in question.

In this context, for example, two reflection coefficient determinations can be carried out for radiation wavelengths in the visible light spectrum, combined with two in the near-infrared spectrum.

Tenderness-related information would also be obtained by subjecting the meat part to a concentrated blast, of predetermined duration and intensity, of a flowing medium, whilst closely observing the evolution of the resultant surface deformation in the meat. Air can be used as the working medium.

A preferred embodiment of the invention is that with which a definitive measurement variable, representing tenderness, is obtained by combining a number of determinations carried out at different radiation wavelengths.

Preferably, the mode of procedure in this case is that measurement variables are regularly determined of new meat specimens of known tenderness and a databank is thus created in which the correlation is established between the results of the determinations and the tenderness experienced in practice.

A concrete device for implementing the proposed method can be realized with a nozzle for the targeted and controlled discharge of a blast of current of a medium, a detection device, interacting therewith, for delivering an electrical output signal representing the behaviour pattern of the impression formed in the meat to be evaluated, and a processing circuit for sampling characterizing parts of the detection signal obtained. The processing circuit is here set up to analyze the initial formation, the maximum size and the relaxation of signal parts representing the impression to be evaluated.

A system for evaluating the tenderness of a meat part of a slaughtered animal, especially slaughtered poultry, utilizing the above-described methods comprises means for comparing the respective measurement results obtained from a conducted evaluation with those obtained during a series of previously conducted determinations and for, on the basis thereof, delivering a measurement value representing the tenderness. This measurement value can then be used to control the product process.

The preceding and other aspects, characteristics and advantages of the present invention will be illustrated in greater detail below with reference to the drawings and with reference to the following description of examples of a method according to the invention.

DESCRIPTION OF THE PREFERRED EMBODIMENTS

Figure 1:
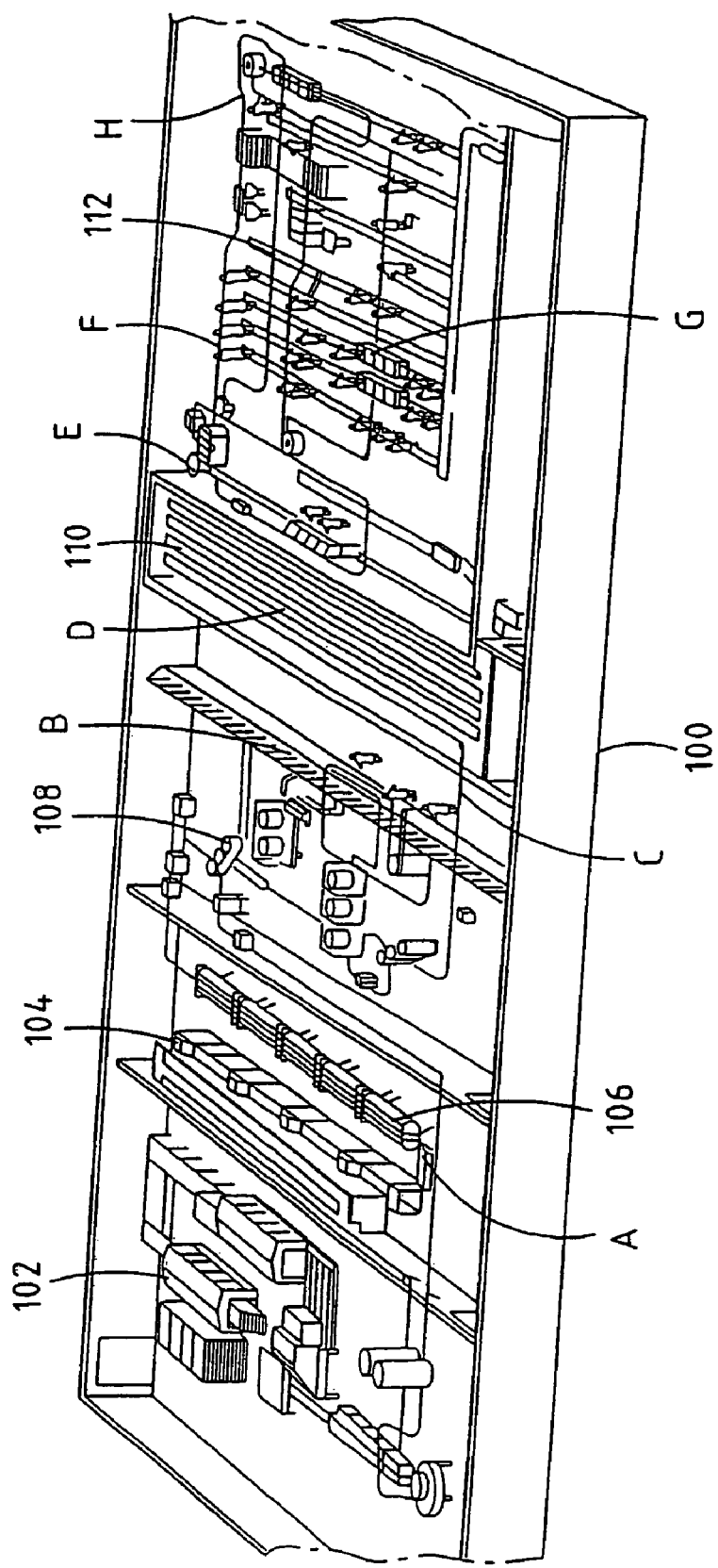
FIG. 1 is a diagrammatic outline drawing of a poultry-processing plant, having indicated thereon the places where the method according to the invention can advantageously be used.

In the processing operation in a slaughterhouse to form poultry parts fit for human consumption, the following steps are realized in general. First of all, the still live poultry is fed, for example in crates, to a stunning device. In the stunning device the poultry is brought into a semi-conscious or unconscious state, allowing the poultry to be hung by its legs in product carriers which are known per se and are advanced along a conveyor. The poultry can be stunned by the use of a controlled gas environment, in which the birds lose consciousness, inter alia due to oxygen deficiency, or by the administration of an electric shock. Usually at the moment when the poultry is just regaining consciousness, the neck of the poultry is cut, so that the bird is killed and will bleed dry. The poultry is next stripped of its feathers in a plucking device provided for this purpose and the poultry can further be processed in downstream processing stations, such as evisceration devices for the harvesting of organs, dividing devices for cutting the carcass of the poultry into parts and deboning devices for cutting away the meat from the bones of the carcass. In the deboning of the carcass, consideration must however be given to the following. Shortly after the death of an animal, an energy supply is still present in the muscles. This energy supply is slowly used up, the so-called maturing or hanging of the meat. This maturing period, easily, occupies a period of 6 to 24 hours. During the maturing, a stiffening and hence a shortening of the muscles, rigor mortis, occurs. If a muscle is cut away from the skeleton before rigor mortis has set in, the muscle will severely contract, without this being prevented by a connection to the bones, and the muscle will stiffen.

The result of this is that a stiffened muscle, after having been prepared by a consumer in a normal way, will be experienced by this consumer as a very tough meat product. If a bird is therefore deboned shortly after the point of death, then a tough product is obtained. At the same time, it is an empirical fact that, in addition to a tough product, a large variation in tenderness also occurs between different products having the same short post-mortem deboning time.

One possibility of shortening the maturing period and hence arriving at a shorter post-mortem deboning time is to use an electrical stimulation of the slaughtered poultry prior to its deboning.

The present invention is based on the insight that the effect of an electrical stimulation of slaughtered poultry for shortening the maturing period in order thereby to achieve shorter deboning times is favourably influenced if poultry is plucked prior to its electrical stimulation. By having the electrical stimulation of the poultry take place downstream of its plucking, reduced pluckability arising from the electrical stimulation is prevented. In addition, the tenderizing effect of the plucking is utilized. The plucking of poultry and, in particular, the mechanical plucking of slaughtered poultry has a tenderizing effect upon the muscles of the slaughtered poultry by virtue of the cells in the muscles of the poultry being set to work.

Research has revealed that, by carrying out the electrical stimulation of the poultry after its plucking, the energy supply still present in the muscles can be further exhausted, thereby resulting in a more tender end product.

The administration of an electrical stimulation according to a first preferred embodiment of a method according to the invention is carried out as follows.

The poultry suspended in product carriers, which product carriers are advanced along a conveyor, is moved forward and, as it is transported, is dragged by the head through a bath containing a salt solution or an aqueous solution. The legs of the carcass are earthed via the product carrier, so that the poultry is subjected to an electrical stimulation (whole body flow). Another possibility is that the carcasses are advanced along two electrically conductive rods, the electrically conductive rods being placed in such a way relative to the carcasses that electrical stimulation takes place across the breast portion of the carcass.

Another very favourable possibility is a combination of the possibilities just stated, namely the earthing of the legs of the carcass via the product carrier and the advancement of the carcass, by the breast, over an electrically conductive rail connected to a voltage source or over a strip-shaped electrode. In order to guarantee the contact between the breast of the carcass and the rail (or strip-shaped electrode), a force is applied to the carcass in the direction of the rail as it is led along the rail. In particular, the carcass, at least whilst it is led along the rail, has an oblique position substantially at right angles to its direction of motion, which can be achieved, for example, by placing the rail in such a way relative to the track, of the product carriers that the carcass, under the influence of gravity, will rest against the rail as it travels over it. The carcass consequently remains in sliding contact with the rail, a very good flow through the body is achieved and the electrical stimulation can be carried out very effectively.

Another option is to direct an air current onto the carcass as it is led over the rail or, for example, to use a second (non-conductive) rail on the rear side of the carcass, so that the carcass is clamped between the rails as it is led over the electrically conductive rail.

During the electrical stimulation of the poultry, it is advantageous to apply a thin film of water to the place where the electrical contact takes place, for example the breast of the poultry. If the electrode is also moistened, a very good result is achieved and local (over-)heating of the skin of the poultry and hence possible unwanted discoloration is prevented.

The carcasses are hereupon exposed to an electrical stimulation with a pulsating alternating voltage $V_1$ of 100 V and a frequency $F_1$ of 50 Hz for a first stimulation period $t_1$ of about 90 seconds.

Research has revealed that the administration of a continuous current is less effective than a pulsating current. When a pulsating current is used, the carcasses are exposed to a voltage pulse having an associated pulse time and a following zero-voltage period having an associated relaxation time. Preferably, the pulse time amounts to about 0.5 second and the relaxation time amounts to about 1 second.

In a second preferred embodiment of a method according to the invention, in which slaughtered poultry is exposed to an electrical stimulation substantially in the same way as in the first preferred embodiment, after the electrical stimulation over the first stimulation period $t_1$ a rest period $t_2$ is provided, during which rest period the poultry is not exposed to an electrical voltage, and after the rest period $t_2$ a second stimulation period $t_3$ is provided, during which stimulation period the poultry is exposed to an electrical stimulation which is wholly consistent with the electrical stimulation over the first stimulation period $t_1$. In this way, as research has shown, the (biochemical) energy supply still present in the muscles can be further exhausted. The rigor mortis process is thereby substantially accelerated.

To a person skilled in the art it will be clear that the embodiments discussed are not limited to the stated durations. According to the circumstances, it is quite conceivable for the stimulation periods $t_1$ and $t_2$ to be longer or shorter, for example 2.5 minutes or 4.5 minutes. Furthermore, the rest periods can also be longer or shorter. It is additionally conceivable that, after the second stimulation period $t_2$, a second rest period $t_4$ followed by a third stimulation period $t_5$ is used, with a view to exhausting the energy supply in the muscles still further.

As previously discussed, the use of an electrical stimulation on slaughtered poultry has an accelerating effect upon the maturing of the meat. It is thereby possible to cut the meat away from the bone to which it is attached sooner after the point of death, in which case the final quality of the end product continues to be guaranteed. In particular, it is possible to debone downstream of the electrical stimulation after a maturing period of about two to three hours post-mortem.

During the process for processing poultry in a slaughterhouse, a choice has to be made on when the maturing process has progressed far enough for the said quality of the end product to be able to be guaranteed. A first option is to choose a fixed point within the said maturing period and to proceed with further processing of the poultry after this maturing period. It is also possible, however, to decide on the point at which further processing can proceed on the basis of changing parameters of the meat during the maturing period and hence during transport of the poultry (in-line).

A first possible parameter on which such a decision can be based is the acidity or pH of the meat. As previously discussed, during the maturing process of the meat the energy supply still present in the muscle is used up. This energy supply is used by the muscle to contract (contraction) and to relax (relaxation), for which the muscle requires calcium and adenosine triphosphate (ATP). Muscle contraction takes place at the moment at which, as a result of a signal from the nervous system, a large quantity of calcium is released into the muscle fibre, which leads to large numbers of contractions, thereby depleting the ATP quantity. For a cell, it is easily still possible to synthesize new ATP through an anaerobic process, glycolysis. The glycogen in the muscles is ultimately converted, via intermediate products such as glucose, into lactic acid, as a result of which the pH in the muscles will fall during the maturing process. By measuring the pH just after the completion of the electrical stimulation or some time afterwards, a prediction can be made on the basis of known data concerning the suitable point at which a start can be made on the further processing.

A second option is to measure in the muscle the degree of exhaustion of the quantity of energy store present, in order to base a decision on this.

In the initial post-mortem period, a muscle tries to maintain a balanced equilibrium between adenine nucleotides; the ATP level remains constant or declines somewhat. If the glycogen store diminishes, the formation of ATP through glycolysis also diminishes. The ATP is dephosphorylated into adenosine diphosphate (ADP) and adenosine monophosphate (AMP). From two ADP molecules, 1 ATP and 1 AMP molecule are formed. In order to allow this reaction to proceed, the AMP is virtually directly deaminated into inosine monophosphate (IMP). IMP can no longer be converted back into ATP. Finally the IMP is systematically converted into inosine and ultimately into hypoxanthine. A parameter for measuring the progress of this process is the so-called R-value, which is an important parameter for the progress of rigor mortis. The R-value is the ratio of the adenine nucleotides (ATP, ADP and AMP) and their breakdown products (IMP, inosine and hypoxanthine). The choice of a certain value of the R-value, at which the meat will have acceptable tenderness, can help to decide the point at which the poultry can be further processed.

The method of electrically stimulating slaughtered poultry after the poultry has been plucked has been discussed at length above. Practice has shown that, in methods known in the prior art, an electrical stimulation has a negative effect upon the pluckability of the poultry if the electrical stimulation precedes the plucking.

As a solution for preventing this adverse effect of electrical stimulation, in addition to having the execution thereof take place after the poultry has been plucked, a short electrical stimulation can also be carried out immediately prior to the plucking. The subcutaneous muscles consequently have virtually no opportunity to stiffen and the pluckability of the poultry is scarcely impaired. A period of about 50 seconds post-mortem should be contemplated in this respect.

As already described above, a further important criterion when assessing the quality of the meat of slaughtered animals, especially slaughtered poultry, is the development in tenderness. An insight into this can be acquired by the gathering of data relating to the tenderness, especially the development in tenderness, of the meat at various points in the production process, thereby offering the possibility of finely adjusting this process on the basis of the data obtained.

A further option of deciding on the point at which further processing can proceed on the basis of changing parameters of the meat over the maturing period, and hence during transport of the poultry (in-line), is described below with reference to FIGS. 1 to 7.

A modern poultry-processing plant according to the prior art, in FIG. 1 denoted in its entirety by reference numeral 100, comprises a delivery and unpacking station 102, the so-called slaughter line 104, plucking line 106, dressing line 108, cooling line 110 and, finally, a deboning and filleting line 112, where the meat of the slaughtered poultry is separated from the bones. Each of these "lines" contains a combination of working stations, all of which is known per se and is consequently not explained in any further detail.

A first place where it can be interesting to obtain data relating to the tenderness of the meat of the poultry to be processed is the position A, i.e. directly before the plucking. There a first quantity of data is then obtained, relating to the quality of the supplied poultry.

A second position of interest is the position B, directly after the "dressing" operation, i.e. after a carcass has been split into parts but has not yet been deboned or filleted. In the position C, too, preceding the cooling, an evaluation of the tenderness of the meat can provide interesting data on the basis of which the further process can be finely adjusted. A determination at the position D—i.e. during the cooling—and position E—after the cooling—enables supplementary data to be obtained, which is also true of the evaluation in the positions F, G and H, i.e. in the deboning and filleting line, whether or not the bleeding times and/or instants, the heating times and/or instants, and/or the plucking times and/or instants are adjustable or in need of adjustment.

By far the most interesting is the evaluation in the position C, since here the tenderness of the meat is evaluated before the carcass is dissected into parts (deboning, filleting) and the data herein obtained can more widely influence the following process duration, especially the duration of the cooling and any intermediate storage prior to filleting and deboning. If the evaluation reveals, for example, that no lengthy cooling or intermediate storage is necessary to obtain satisfactory tenderness in the end product, the process duration can be regulated accordingly, whereby substantial savings can be made.

Figure 2:
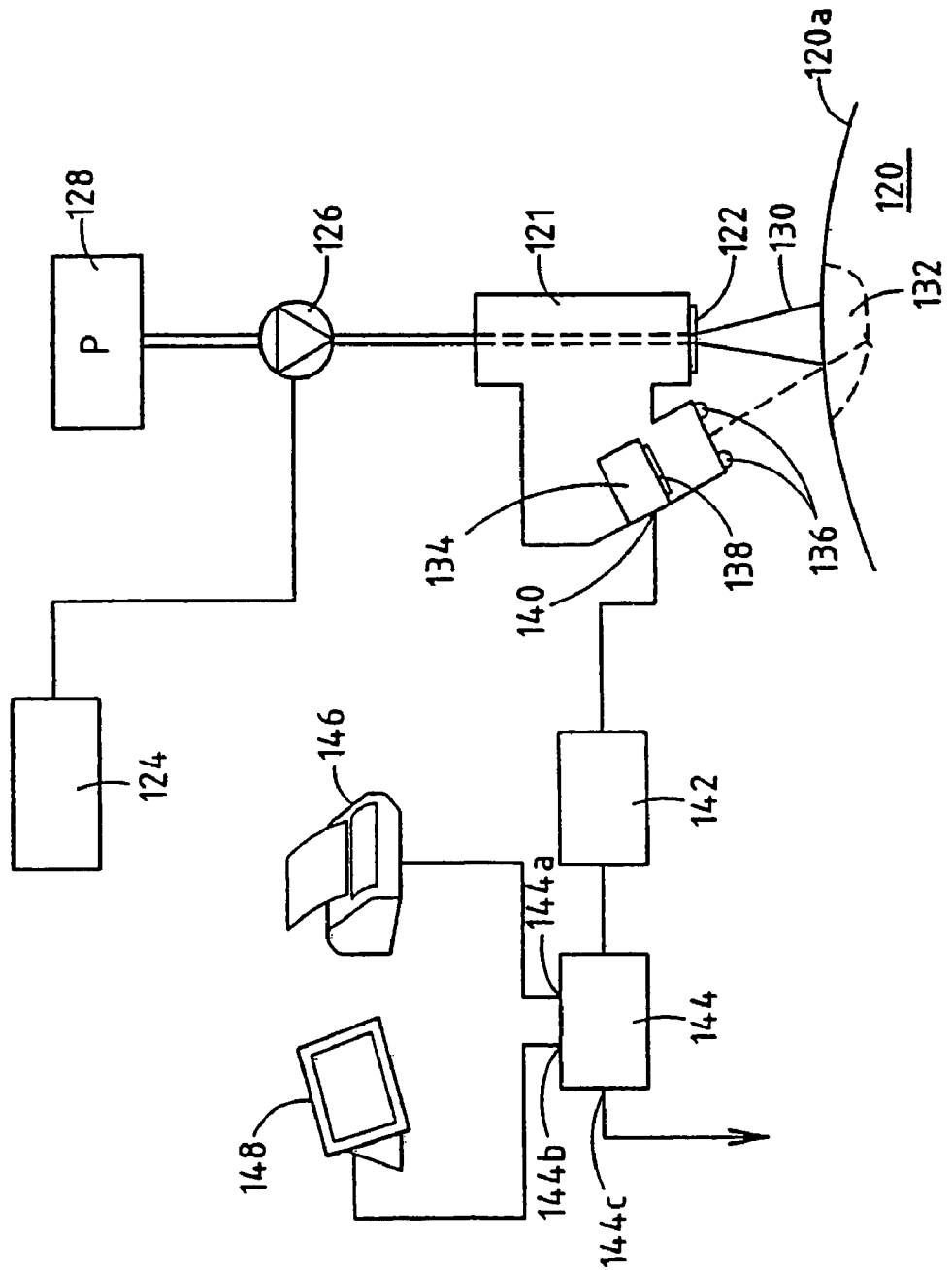
FIG. 2 is a block diagram representation of a device for implementing the proposed method.
Figure 3:
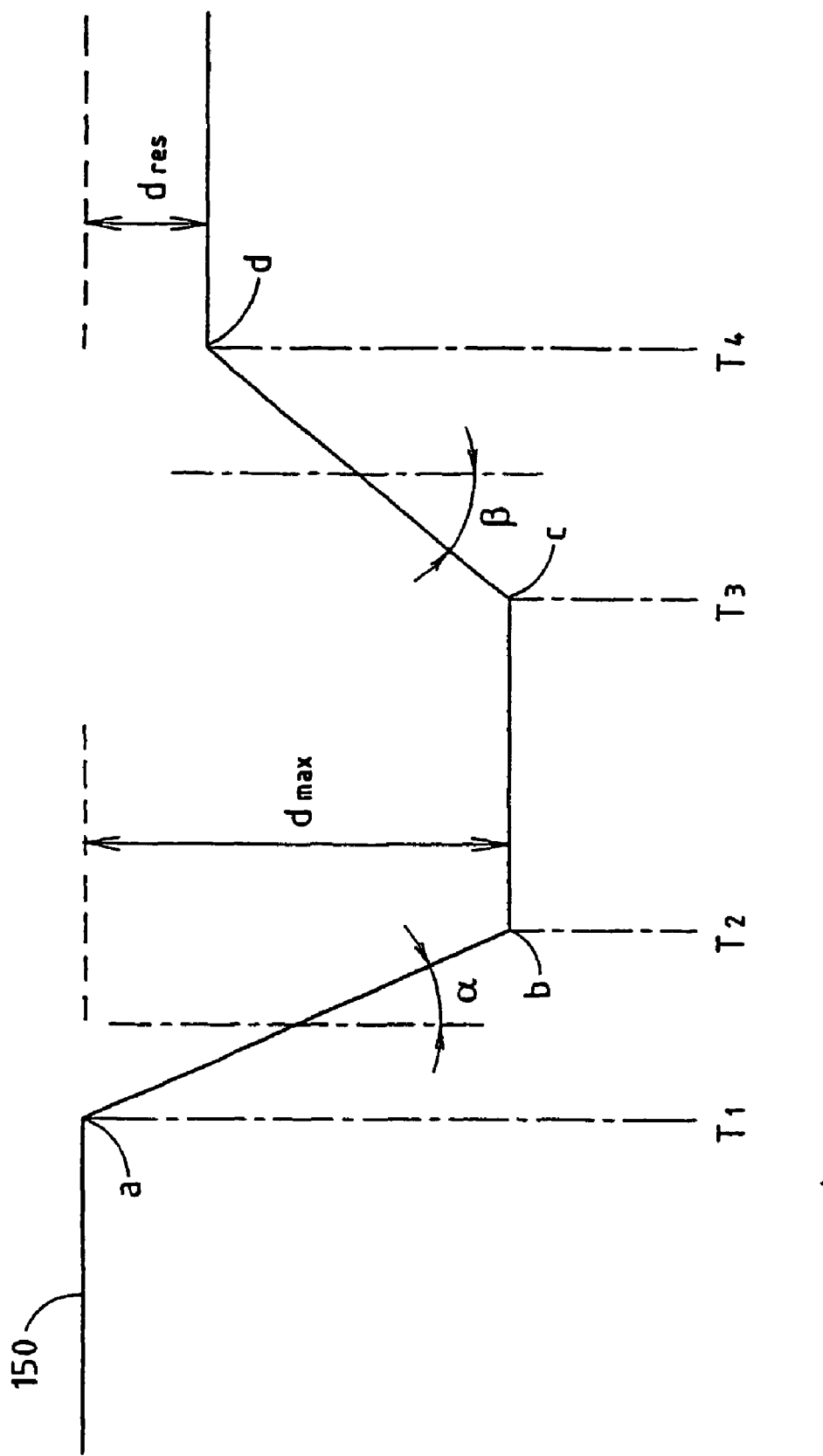
FIG. 3 reproduces a graph indicating the behaviour pattern of the surface deformation formed during the implementation of the method.

A device with which the evaluation can be realized is shown in diagrammatic representation in FIGS. 2 and 3. A meat part to be evaluated is denoted by 120; the housing 121 of the device which acts thereupon comprises a spray nozzle 122, which, via an electric valve 126 to be regulated from a control circuit 124, is connected to a pressure source 128 of the medium used, for example air. Another suitable medium, possibly a liquid, can also be used. The impression 132 formed by the action of the discharged jet 130 in the surface 120*a* of the meat part 120 is "viewed" by a suitable detector 134, also accommodated in the housing 121. This detector 134 can comprise, for example, a radiation-sensitive detector 138, which interacts with converters 136 transmitting flashes of light which are reflected by the bottom of the "impression" 132 and, after reflection, fall upon the detector 138; the running time elapsed between the transmission of a pulse by the converters 136 and the return received after the reflection and by the detector 138 is then a measure of the "depth" d of the impression 132, since the distance between detection device and surface 120*a* is, after all, known. It is also conceivable to use a system which operates in the manner known from the modern cameras and which can determine the distance between an image plane and an object plane.

In whatever way: the device 134 delivers, at its output 140, an electric voltage, the behaviour pattern of which represents the evolution of the formed impression 132. This voltage is supplied to suitable processing circuits 142, 144 (possibly analog/digital converters, interface circuits, memory stores, etc.), the realization of which is not a subject of the invention. It is conceivable to store the evaluation results of a number of standard test pieces as standard in a memory in the circuit 144 and to produce an evaluation result using an effective comparator. The circuit 144 has three outputs: the one, 144*a*, feeds the evaluation result in suitable form to the printer 146; and the second, 144*b*, feeds the evaluation result in suitable form to the display 148 and the third, 144*c*, feeds the evaluation result in the form of a parameter variable to a central control unit (not specifically drawn), by which the throughput times in the various working lines of the plant are set.

It should be noted that, in fact, the printer 146 and the display 148 can suffice: in this case an operator can directly read off the evaluation result and, on the basis thereof, finely adjust the process.

FIG. 3 shows the graphic representation of the behaviour pattern of the output voltage of the detector 138 representing the depth d, namely in the form of the path of the curve 150. At the moment T1, the "radiation pulse" starts and the depth d of the formed impression begins to increase to the value $d_{max}$ at the moment T2. After this the depth remains more or less constant to the moment T3, the moment at which the "radiation pulse" ends. The depth then declines again to a residual value, denoted by $d_{res}$.

For the evaluation of the tenderness, the path of the curve between the points a and b thereof, i.e. between the times T1 and T2, and, in fact, the value of the angle α are of interest. This can be simply determined by differentiating the output voltage of the detector between the moments T1 and T2. Also of interest is the maximum depth of impression, which follows from the maximum value of the output voltage. If, at the moment T3, i.e. at the moment c of the curve 150, the radiation pulse stops, the meat starts to recover and the depth of impression d declines again to a residual value $d_{res}$, which is reached after the moment T4, at the point d of the curve. Here, too, the value of the angle β is again of interest, which value can be simply determined. The assessment of the curve 150 does not therefore call for any very highly developed electronics.

By determining in advance, for a large number of meat pieces of known tenderness, the curve represented in FIG. 3, with its associated variables, and storing this all in a memory, a comparison of the measurement result with these "calibration data" enables a pronouncement to be made, with a good degree of certainty, about the tenderness of the meat.

Figure 4:
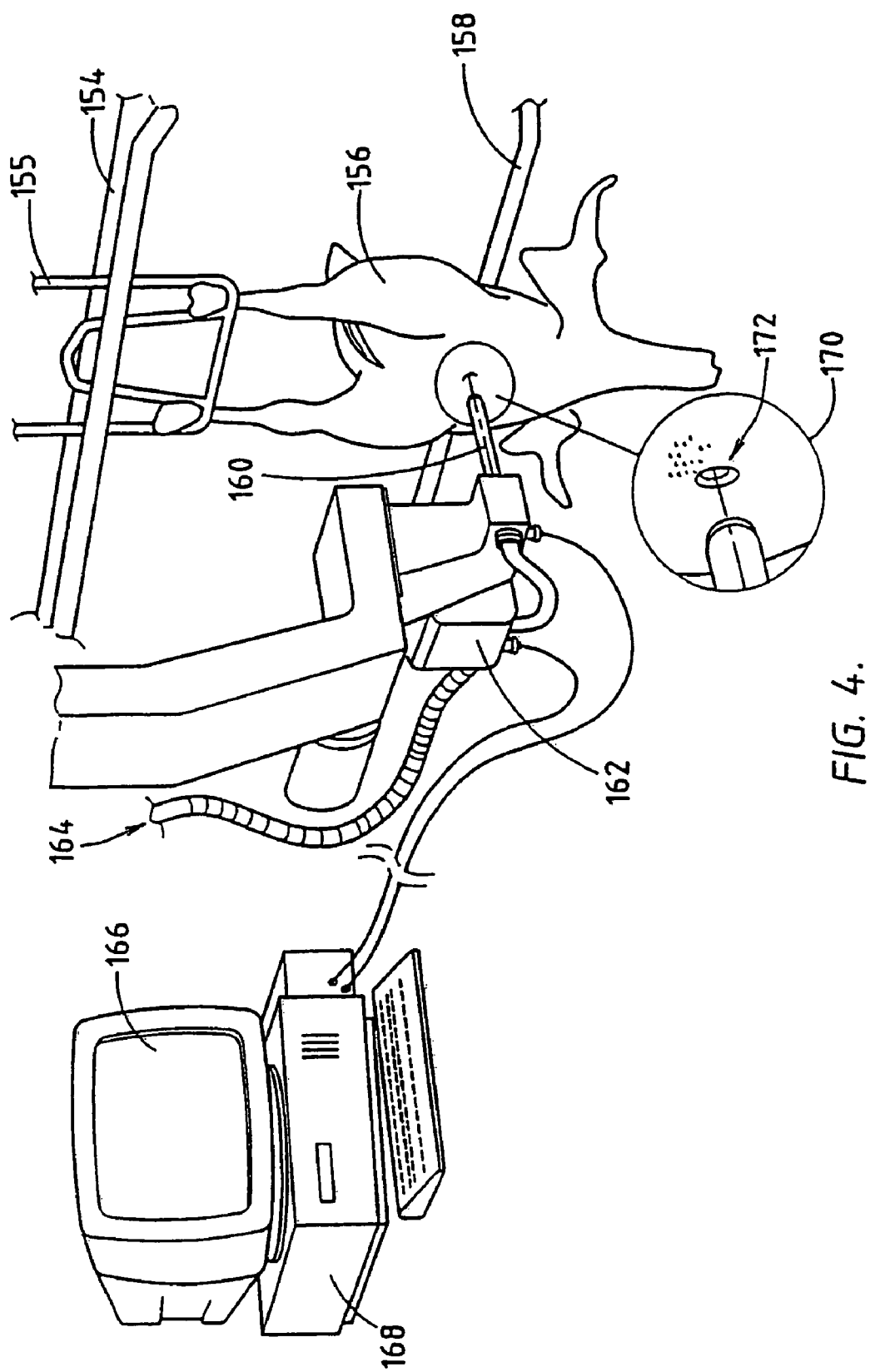
FIG. 4 is a diagrammatic representation of a first embodiment of a device according to the invention.
Figure 5B:
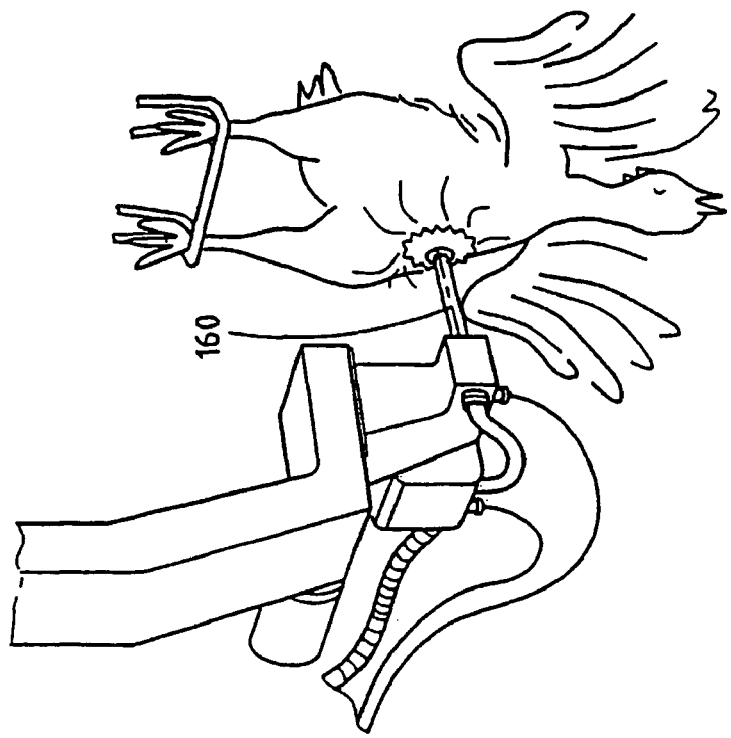
FIGS. 5a and 5b are diagrammatic representations of a second embodiment of the invention.
Figure 5A:
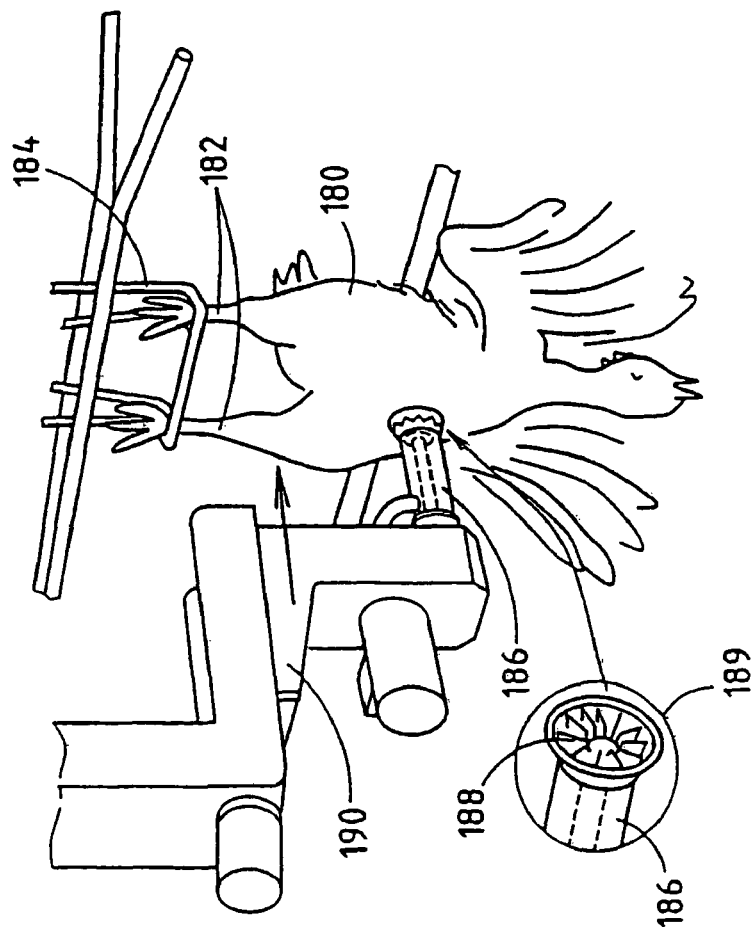
Figure 6:
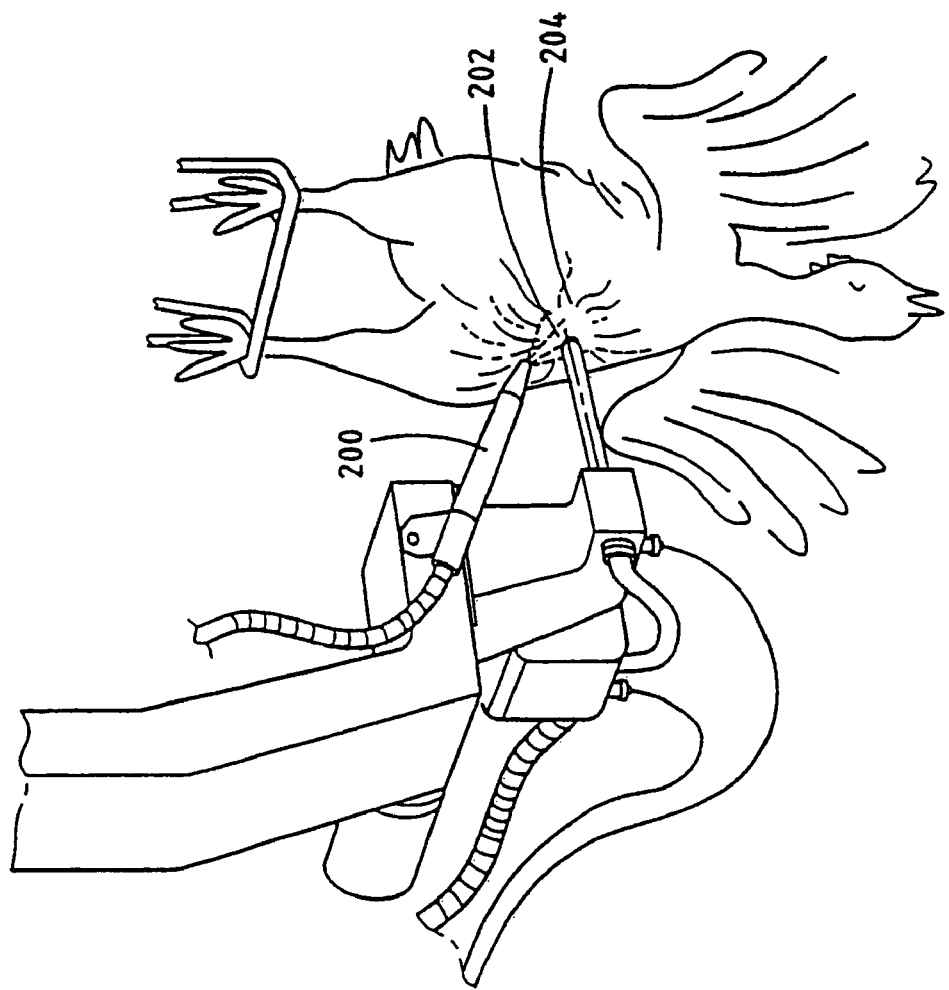
FIG. 6 shows diagrammatically a third embodiment of the invention.

FIGS. 4 to 6 show diagrammatically some illustrative embodiments according to the invention by which a determination is carried out on the meat of a slaughtered animal which is still suspended from a conveyor track. FIG. 4 shows a transport hook 155 which is led along a track 154 and from which an already plucked carcass 156 is hanging, which carcass, at the place of the measuring arrangement, bears against the stop rod 158. The device contains the aforementioned nozzle 160, connected via the controlled valve 162 to a pressure source, symbolically indicated by the arrow 164; the detection portion located near the nozzle 160 is not visible in this figure but can be realized in the manner explained with reference to FIG. 2. The measurement result obtained is represented on the monitor 166 connected to the evaluation and processing electronics 168. Within the circle 170 there is represented, on an enlarged scale, the impression 172 formed in the meat, as previously discussed.

FIG. 5a relates to the case in which the carcass 180, with its legs 182 suspended from the customary suspension hook 184, has not yet been plucked, so that the disruptive influence of the feathers present needs to be overcome. To this end, use is made according to this figure of a sort of "shaving" bar 186 having rotating knives 188, which are represented on an enlarged scale at 189. The whole is supported by a suitable holder 190, in which the various drive units are also accommodated.

FIG. 5b shows how, after this "clean-shaving", the evaluation is conducted in the manner explained with reference to FIG. 4: the apparatus used is in both cases the same.

FIG. 6 shows an embodiment which broadly coincides with that according to FIG. 4 but which has been made suitable for carrying out an evaluation on poultry yet to be plucked. To this end, there is a second nozzle 200; through this nozzle, a gentle air jet is aimed at the spot 202 to be evaluated on the breast side of the poultry, so that the feathers 204 present there are blown apart and the evaluation can be carried out using the device conforming to that according to FIG. 4.

Figure 7:
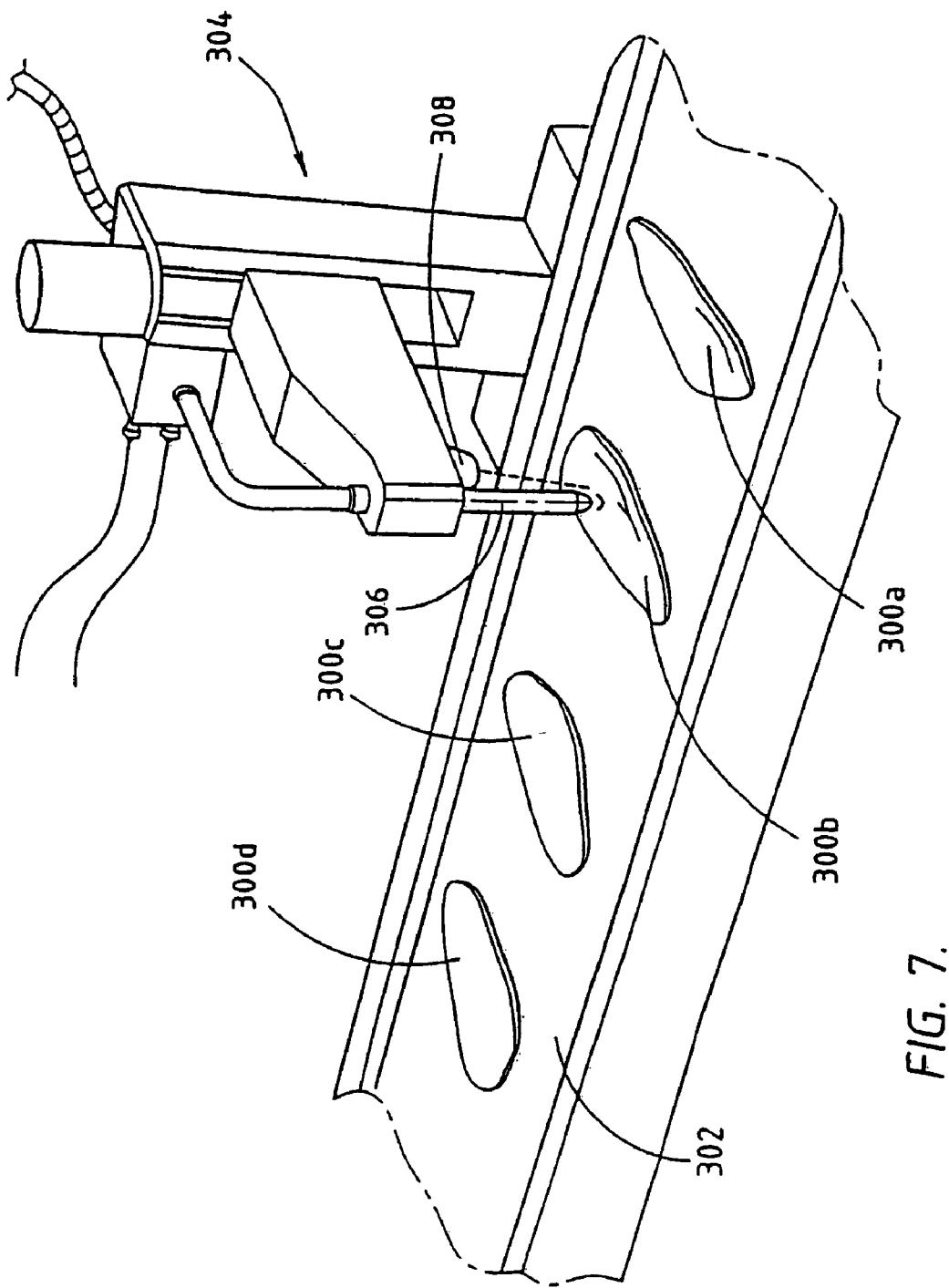
FIG. 7 illustrates a fourth embodiment of the invention.

FIG. 7, finally, shows how the device can be simply deployed to assess pieces of meat of slaughtered birds, for example breast fillets 300a-300d, which are guided by means of the conveyor track 302 along the evaluation device 304.

Here too, the evaluation device comprises the spray nozzle 306 and still visible behind it in this figure there is a portion of the detection device 308, realized in accordance with the detection device explained with reference to FIG. 2.

To a person skilled in the art, it will be clear that the scope of the present invention is not limited to the embodiments described above but that various changes and modifications can be made thereto without deviating from the scope of the invention as defined in the attached claims.

It is thus possible, for example, to apply the gathering of data relating to the tenderness of the slaughtered birds independently from the electrical stimulation of the slaughtered birds, it is also possible to apply the electrical stimulation of the slaughtered birds independently from the gathering of the said data.

What is claimed is:

1. A method for processing poultry, comprising the steps of:
   supplying live poultry;
   stunning the live poultry in a stunning device;
   placing the stunned poultry into product carriers advanced along a conveyor;
   killing the stunned poultry;
   removing the feathers from the dead poultry in a plucking device; and
   exposing the poultry to an electrical stimulation upstream and downstream of the plucking device.

2. The method according to claim 1, wherein the electrical stimulation upstream of the plucking device is carried out at a period prior to the plucking so that the poultry is not stiffened when plucked.

3. The method according to claim 1, wherein the electrical stimulation upstream of the plucking device is carried out immediately prior to the plucking.

4. The method according to any one of claims 1-3, wherein the electrical stimulation upstream of the plucking device is carried out within a period of about 50 seconds post-mortem.

5. The method according to claim 1, wherein the electrical stimulation downstream of the plucking device is carried out for at least a first stimulation period.

6. The method according to claim 5, further comprising the step of deboning the poultry after at least the first stimulation period following the expiry of a waiting period.

7. The method according to claim 6, further comprising the step of cooling the poultry, after at least the first stimulation period, during the waiting period.

8. The method according to claim 1, wherein an electric voltage is applied across the carcass of the poultry, or at least across a part thereof, by the carcass being dragged by the head through a bath connected to a power source and containing an aqueous solution, the legs of the carcass being earthed via the product carrier.

9. The method according to claim 1, wherein an electric voltage is applied across the carcass of the poultry, or at least across a part thereof, electrical contact occurring at the location of the breast of the carcass.

10. The method according to claim 9, wherein the carcass is led by the breast over an electrode connected to a power source.

11. The method according to claim 9, wherein the carcass is led by the breast over an electrically conductive rail connected to a power source.

12. The method according to claim 11, wherein a force is applied to the carcass in the direction of the rail.

13. The method according to claim 9, wherein the legs of the carcass are earthed via the product carrier.

14. The method according to claim 9, wherein a thin film of water is provided at the place where the electric voltage is applied.

15. The method according to claim 1, further comprising the step of controlling process parameters in a process of mechanized working of slaughtered poultry, wherein the tenderness of a specified meat portion is evaluated prior to a due processing step and, after this evaluation, the important process parameters for the particular processing step are set to an optimal value.

16. A poultry-processing plant for processing poultry, comprising:
   a supply station for supplying live poultry;
   a stunning device for stunning the live poultry;
   a station for placing the stunned poultry into product carriers of a conveyor;
   a killing device that kills the stunned poultry;
   a plucking device for removing the feathers from the dead poultry; and
   an electrical stimulation device for exposing the poultry upstream and downstream of the plucking device to an electrical stimulation.

17. The poultry-processing plant according to claim 16, wherein the electrical stimulation device is configured to apply an electric voltage across the carcass of the poultry, or at least across a part thereof, such that electrical contact occurs at the location of the breast of the bird.

18. The poultry-processing plant according to claim 17, wherein the electrical stimulation device comprises—an electrically conductive rail connected to a power source, the rail being configured such that a carcass is led over the rail by the breast.

19. The poultry-processing plant according to claim 16, wherein the electrical stimulation device comprises an electrode connected to a power source, the electrode being configured such that the carcass is led over the electrode by the breast.

20. A poultry-processing plant for processing poultry, comprising:
   a supply station for supplying live poultry;
   a stunning device for stunning the live poultry;
   a station for placing the stunned poultry into product carriers of a conveyor;
   a killing device that kills the stunned poultry; and
   a plucking device for removing the feathers from the dead poultry; and
   an electrical stimulation device for exposing the poultry downstream of the plucking device to an electrical stimulation for at least a first stimulation period.

21. The poultry-processing plant according to claim 20, wherein the electrical stimulation device is configured to apply an electric voltage across the carcass of the poultry, or at least across a part thereof, such that electrical contact occurs at the location of the breast of the bird.

22. The poultry-processing plant according to claim 21, wherein the electrical stimulation device comprises an electrically conductive rail connected to a power source, the rail being configured such that a carcass is led over the rail by the breast.

23. The poultry-processing plant according to claim 20, wherein the electrical stimulation device comprises an electrode connected to a power source, the electrode being configured such that the carcass is led over the electrode by the breast.

24. A poultry-processing plant for processing poultry, comprising:
   a supply station for supplying live poultry;
   a stunning device for stunning the live poultry;
   a station for placing stunned poultry into product carriers of a conveyor;
   a killing device that kills the stunned poultry;
   a plucking device for removing feathers from dead poultry; and
   an electrical stimulation device for exposing poultry downstream of the plucking device to electrical stimulation.

\* \* \* \* \*